United States Patent [19]

Suranyi

[11] 4,437,148

[45] Mar. 13, 1984

[54] PEAK VOLTAGE CLAMPED POWER SUPPLY

[75] Inventor: Gabriel G. Suranyi, Rockaway, N.J.

[73] Assignee: Western Electric Co., Inc., New York, N.Y.

[21] Appl. No.: 328,980

[22] Filed: Dec. 9, 1981

[51] Int. Cl.³ .................... H02P 13/26

[52] U.S. Cl. .................... 363/89; 363/126; 363/53; 323/274

[58] Field of Search .................... 363/44-48, 363/52-53, 86, 89, 125-127; 323/273-275, 303; 307/540, 543-545, 557, 567

[56] References Cited

U.S. PATENT DOCUMENTS

| | | | |
|---|---|---|---|
| 2,862,170 | 11/1958 | Hjermstad | 363/47 X |
| 3,456,155 | 7/1969 | Buchanan | 323/303 X |
| 3,470,451 | 9/1969 | Arase | 363/89 |
| 4,075,685 | 2/1978 | Fisler | 363/44 |
| 4,183,082 | 1/1980 | Ishii | 323/303 X |

FOREIGN PATENT DOCUMENTS

| | | | |
|---|---|---|---|
| 2625307 | 12/1977 | Fed. Rep. of Germany | 323/274 |
| 763316 | 12/1956 | United Kingdom . | |
| 498617 | 3/1976 | U.S.S.R. | 323/303 |
| 553605 | 5/1977 | U.S.S.R. . | |

OTHER PUBLICATIONS

"The Radio Amateur's Handbook", 1976, pp. 120-123.

Pressman, "Switching and Linear Power Supply, Power Converter Design", Hayden Book Co., Inc., 1977, pp. 24-32.

"Electronics Magazine", Jun. 16, 1981, pp. 106-138.

*Primary Examiner*—Peter S. Wong

*Attorney, Agent, or Firm*—G. W. Houseweart

[57] ABSTRACT

The cost and energy efficiency of a power supply are optimized in a semi-regulated circuit wherein regulation occurs only under a high voltage, low current condition when peak output voltage would otherwise exceed a maximum specified voltage. The circuit includes a full wave rectifier (21-24) driving a modified pi filter (33-35). A transistor (62) in series with the filter is biased by a resistor (65) to normally operate in a fully saturated, low power dissipating mode. When the output (31-32) voltage approaches the specified maximum, the breakdown voltage of a zener diode (71) is exceeded, and the output voltage is clamped to the specified maximum through the zener diode and the base-emitter junction of the transistor.

4 Claims, 2 Drawing Figures

PEAK VOLTAGE CLAMPED POWER SUPPLY

TECHNICAL FIELD

This invention relates to power supplies and, more specifically, to low cost, energy efficient forms of direct current supplies.

BACKGROUND OF THE INVENTION

In this electronic era a great variety of direct current power supplies have been designed to meet a vast spectrum of differing circuit requirements. Depending on the amount of power to be supplied and the amount of regulation of voltage output required, these designs have ranged from relatively simple and inexpensive combinations of two or more diodes forming a full wave rectifier to very complex and expensive designs employing large power transistors and integrated circuits. An informative summary of commercially available versions of such supplies can be found in the June 16, 1981 issue of *Electronics* magazine, beginning at page 106.

For some applications, such as some key telephone systems, there has been a need for an inexpensive, energy efficient power supply, the output voltage of which need not be precisely regulated but which should not be allowed to rise above a predetermined limit regardless of input line voltage variations. Conventional switching supplies which regulate power through pulse width modulation are considered too costly for such an application, and conventional linear supplies tend to be too inefficient, thus requiring provision for dissipating excessive amounts of heat.

SUMMARY OF THE INVENTION

The instant invention addresses the above-described need in making available a relatively economical and efficient supply, which provides an output voltage clamped to rise no higher than a predetermined limit.

The supply includes a circuit for providing a full wave rectified voltage, which is applied to a filter for reducing the ripple thereof. Collector and emitter terminals of a transistor are coupled in series with the filter. Expedients are included to bias the transistor into a saturated, lower power dissipation mode over a greater portion of the expected operating range of the circuit and to bias the transistor into a higher power dissipating unsaturated mode over a lesser portion of the operating range.

In a described embodiment, the biasing is accomplished by providing a second full wave rectified voltage to a series combination of an impedance element and a zener diode. The base terminal of the transistor is coupled to a common node between the impedance element and the zener diode, thereby effectively clamping the output voltage of the supply to a predetermined value related to the breakdown voltage of the zener diode.

BRIEF DESCRIPTION OF THE DRAWING

The aforementioned and other features, characteristics and advantages, and the invention in general will be better understood from the following more detailed description taken in conjunction with the accompanying drawing in which.

DETAILED DESCRIPTION

Figure 1:
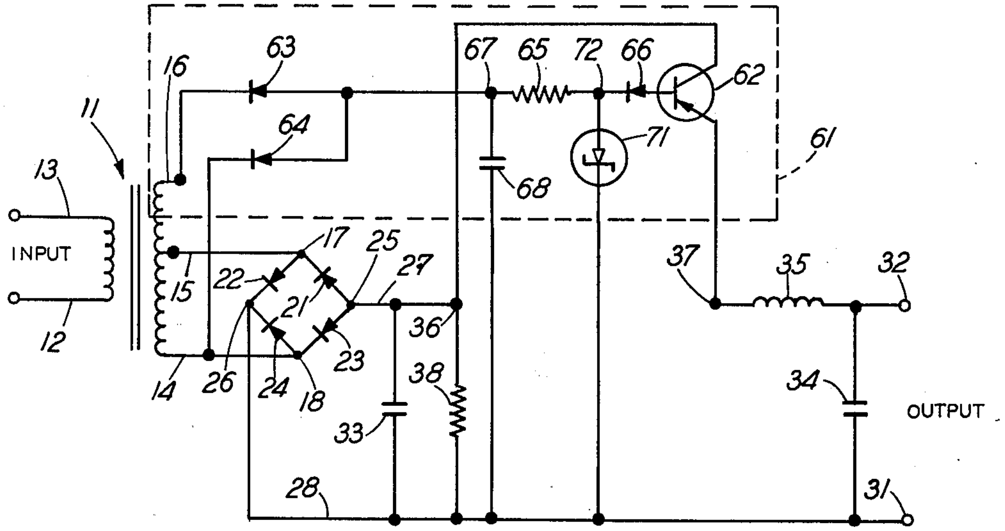
FIG. 1 is a schematic diagram of an improved power supply circuit in accordance with an embodiment of this invention.

With reference now to FIG. 1, the power supply circuit includes a transformer, designated generally 11, having a pair of input lines 12 and 13 and three output lines 14, 15 and 16. Transformer 11 may employ a conventional iron core and be wound to accept a nominal sinusoidal line voltage, e.g., about 117 volts, and, in response thereto, to provide across output lines 14 and 15 a nominal sinusoidal voltage of about 24 volts and across output lines 15 and 16 a nominal sinusoidal voltage of about 10 volts. Throughout the description, root mean square (rms) values of voltage are used when referring to sinusoidal voltages.

Output lines 14 and 15 are coupled to a pair of nodes 17 and 18 of a conventional full wave rectifying bridge comprising diodes 21, 22, 23 and 24. As will be recognized, diodes 21–24 are poled to provide across a pair of bridge output nodes 25 and 26, a voltage of polarity such that node 25 is negative with respect to node 26.

A capacitor 33 is coupled between lines 27 and 28; and, as is known, the resultant output voltage of a full wave rectifier followed by a capacitor is equal to about the input voltage to the rectifier divided by 0.93. Accordingly, there is provided across lines 27 and 28 a full wave rectified voltage of about 25.7 volts, and line 27 is negative with respect to line 28.

As is well known, the output voltage of a full wave rectifier by itself would contain significant ripple and would vary proportionally with variations in magnitude of input line voltage to the transformer 11. Accordingly, it is conventional to employ some kind of filtering and often further regulation to the voltage from a full wave bridge rectifier to provide a smoother and better regulated voltage at a pair of output terminals 31 and 32.

A typical kind of filter, commonly termed a pi filter would include a pair of capacitors, such as capacitors 33 and 34 coupled in parallel with output terminals 31 and 32 and across the output of the full wave rectifier, and an inductor, such as inductor 35, in series with either terminal 32 or 31. The typical pi filter would be completed by connecting a pair of nodes 36 and 37 together and not employing the additional elements in FIG. 1, except for a bleeder resistor, such as resistor 38, to discharge the capacitors in the event of an open circuit across output terminals 31 and 32 when the input line voltage is turned off.

Figure 2:
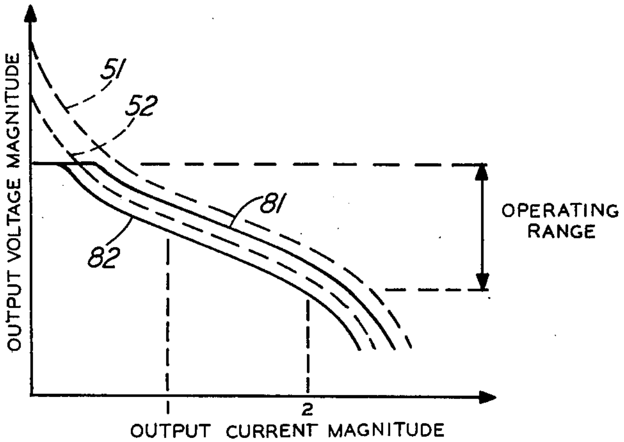
FIG. 2 is a graph depicting output voltage as a function of input voltage over an expected operating range of certain power supplies.

Such a conventional pi-filtered supply, even though not well regulated, has found wide use in a great variety of applications. However, as indicated somewhat schematically by curves 51 and 52 in FIG. 2, such a supply has an undesirable attribute of providing a sometimes unacceptably high peak output voltage when the output is open or providing only small output current. As will be appreciated, curve 51 is for a higher input line voltage to transformer 11 and curve 52 is for a lower input line voltage.

To overcome the aforementioned problem, the elements within the broken line rectangle 61 of FIG. 1 advantageously are employed to limit the rise in output voltage of the supply, without incurring significant loss of efficiency in the overall supply.

As can be seen in FIG. 1, the collector and emitter terminals of a PNP transistor 62 are connected in series between nodes 36 and 37 of what would otherwise be the above-described conventional pi filter. Transistor 62 is biased to operate in a low power dissipation, saturated mode at all times except for the condition of relatively high input line voltage and zero or small output current.

Such biasing of transistor 62 is provided by a combination of elements including an additional full wave rectifier including a pair of diodes 63 and 64, a resistor 65, and a diode 66 coupled to the base terminal of the transistor.

A capacitor 68 is included between line 28 and node 67 simply to smooth the ripple of the full wave rectified voltage waveform from diodes 63 and 64. Additionally, a zener diode 71 is coupled between line 28 and a common node 72 between resistor 65 and diode 66.

Zener diode 71 is selected to have a breakdown voltage such that breakdown occurs and pulls current through diode 66 and the base-emitter of transistor 62 only when the voltage at output terminal 32 has reached the peak desired value. At all other times, zener 71 is not to be in full breakdown and not to participate significantly in the circuit. Thus, if the maximum output voltage of about 25 volts at terminal 32 is desired, zener 71 may be selected to have about a 24 volt breakdown voltage. If a 24.5 volt zener were readily available, the voltage dropping diode 66 would, of course, not be needed in the circuit, the use or non-use of such voltage dropping diodes being well known in the art.

For output voltages less than about 25 volts, the resistor 65 serves principally to bias transistor 62 in a low power dissipating saturated mode. As will be appreciated from the prior discussion with respect to transformer 11, the combination of diodes 63 and 64 with capacitor 68 provides at node 67 a full wave rectified voltage of about 36.5 volts, i.e., 34 volts divided by 0.93, and node 67 is negative with respect to line 28. Thus, for output voltages across output nodes 31 and 32 of no greater than about 25 volts, there will be at least 10 volts across resistor 65. If resistor 65 is selected to be relatively small, e.g., 250 ohms, then about 40 milliAmperes (mA) of current will be drawn through the emitter-base of transistor 62 with 10 volts across resistor 65. By selecting transistor 62 to have a gain of at least 50, then transistor 62 will be saturated for all collector-emitter currents up to about 2 Amperes.

In view of the foregoing it will be seen that over the greater portion of the operating range of input line voltages and output currents, transistor 62 is biased to operate in a saturated mode, where collector-emitter voltage is very low, e.g., typically about 0.2 volts, and so power dissipation and consequent loss of energy efficiency are very low. Further, of course, in the saturated mode, transistor 62 exhibits low impedance between collector and emitter, thus allowing capacitors 33 and 34 and inductor 35 to operate essentially as a simple pi filter prior to breakdown of zener diode 71. Such operation is indicated by curves 81 and 82 in FIG. 2 being parallel to their respective curves 51 and 52 prior to breakdown of zener 71.

However, as also indicated by the leftmost portions of curves 81 and 82, at a smaller portion of the operating range, the clamping action of zener 71 tends to pull transistor 62 out of saturation when necessary to permit the clamping action and effectively limit the output voltage to the predetermined acceptable maximum value.

As a more specific example, a power supply as described above for converting an alternating current line voltage of about 117 volts (variable ±10% in voltage and ±5% in frequency) to a direct current voltage of about 25 volts and intended for an operating range of zero to 2 amps, may employ the following components. Transformer 11 may be a Model DL 56-2 from Signal Transformer Company, 500 Bayview Avenue, Inwood, N.Y. 11696. The four diodes 21–24 may be a full wave bridge, Model MB81, from Windsor Semiconductor, 8900 Winnetka Avenue, North Ridge, Calif. 91324. Diodes 63, 64 and 66 may be type lN4002. Capacitor 33 may be a 4600 microfarad electrolytic, capacitor 34 may be 1000 microfarad electrolytic and capacitor 68 may be 1200 microfarad electrolytic. Resistors 38 and 65 may both be 261 ohm. Inductor 35 may be a type CH-4, also available from the above-mentioned Signal Transformer Company. Zener diode 71 may be a lN1598, and transistor 62 may be a type D45H8, available from General Electric Company. Of course a wide range of alternatives may as well be employed.

Although the invention has been described in part by making detailed reference to a specific embodiment, such detail is intended to be and will be understood to be instructive rather than restrictive. It will be understood by those in the art that many variations may be made in the structure and mode of operation without departing from the spirit and scope of the invention as disclosed in the teachings contained herein.

For example, it should be apparent that either or both of the full wave rectifiers of the circuit of FIG. 1 may as well be bridges or simple diode pairs or any of a variety of alternative expedients for providing full wave rectification.

What is claimed is:

1. A circuit for efficiently stabilizing and limiting a direct current voltage at an output thereof comprising:

means for supplying a first full wave rectified voltage;

filter means for stabilizing and reducing the ripple of the first full wave rectified voltage;

a transistor having a collector terminal and an emitter terminal coupled in series with the filter means;

means, coupled to the transistor, for biasing the transistor to function in a lower power dissipating saturated mode over a greater portion of the expected operating range of the circuit when the output voltage of the circuit is less than a predetermined maximum and for biasing the transistor to function in a higher power dissipating unsaturated mode over a lesser portion of said range when the output voltage of the circuit is substantially equal to the predetermined maximum; and means for supplying a second full wave rectified voltage having a peak value different from the peak value of the first full wave rectified voltage; and wherein the biasing means includes a zener diode coupled to a base terminal of the transistor and, in series through a biasing impedance element, to the second full wave rectified voltage.

2. A circuit as recited in claim 1 further comprising a capacitor coupled in parallel with the series combination of the zener diode and the impedance element for smoothing the ripple of the second full wave rectified voltage.

3. A circuit as recited in claim 2, wherein:

the filter is a pi filter having a pair of capacitors coupled in parallel with the output and an inductor coupled in series with the output; and the collector and emitter terminals of the transistor are coupled in series with the inductor.

4. A circuit as recited in claim 3 further comprising a bleeder resistor coupled in parallel with the output.

* * * * *